United States Patent [19]

Ito

[11] 4,058,041
[45] Nov. 15, 1977

[54] ROTARY DRUM TYPE FLYING SHEAR MACHINE

[75] Inventor: Kunihiro Ito, Kobe, Japan

[73] Assignee: Kawasaki Jukogyo Kabushiki Kaisha, Kobe, Japan

[21] Appl. No.: 745,822

[22] Filed: Nov. 29, 1976

[30] Foreign Application Priority Data

Dec. 4, 1975 Japan .............................. 50-145362

[51] Int. Cl.² .......................................... B23D 25/12
[52] U.S. Cl. ...................................... 83/305; 83/337; 83/528
[58] Field of Search ................. 83/337, 338, 304, 305, 83/285, 296, 528

[56] References Cited

U.S. PATENT DOCUMENTS

| 1,988,215 | 1/1935 | Peterson | 83/305 X |
| 2,369,253 | 2/1945 | Robinson et al. | 83/337 X |
| 2,642,938 | 6/1953 | Hallden | 83/305 |
| 3,296,909 | 1/1967 | Hudak et al. | 83/305 |

Primary Examiner—J. M. Meister

[57] ABSTRACT

The upper and lower shear drums of flying shears having respective shear blades are driven continuously by one motor at a tangential speed synchronized to the translational speed of a stock strip traveling therebetween, and the upper drum is moved between an upper non-shearing position and a lower position for cooperative shearing of the strip with the lower drum by an upper drum displacing mechanism driven by another motor controlled to undergo operational cycles each starting from full stop and ending at full stop during an integral number of revolutions of rotation of either of the drums.

2 Claims, 4 Drawing Figures

ROTARY DRUM TYPE FLYING SHEAR MACHINE

FIELD OF THE INVENTION

This invention relates generally to steel processing means in steel manufacturing plants and more particularly to an improved rotary drum type flying shear machine for dividing long hot-rolled steel materials such as hoop steel, steel shapes, bar steel, and wire traveling at high speed at the delivery side of a finishing stand of a continuous hot-rolling mill into specified lengths suitable for take-up coils or cooling beds.

PRIOR ART

A recent trend in continuous hot-strip mills (hereinafter referred to as hot-strip mills) is a speeding up of the strip traveling speed at the delivery side of the finishing stand of from a conventional value of the order of 600 meters per minute (m./min.) to 1,000 m./min. or more. Furthermore, as a result of the adoption of large slabs, the weight of a take-up coil has been increased from the conventional value of approximately 25 tons to 40 tons or more.

Coils of both great weight and large dimensions produced in a high-speed, high-efficiency hot strip mill of this recent character are being supplied to and processed in lines such as a pickling line, skin-pass line, and shear line having correspondingly large processing capacities within the steel making plant itself without much difficulty. However, there are problems in the production of coils to be sold outside which have been made to conform with the coil handling capacities of the plant facilities of users such as cutting and shearing plants, motor vehicle manufacturers, and line pipe manufacturers. That is, when dividing by shearing is carried out in conformance with the weight of the above mentioned coils for external sales by means of flying shears such as rotary type flying shears for cutting crop end of strip (i.e., rotary crop shears) or rotary type flying shears for cutting stock into desired sectional lengths (i.e., rotary flying shears) installed in a hot strip mill, the following difficulties are encountered.

In rotary crop shears, a so-called start-stop control system, wherein shearing is accomplished by starting and stopping the rotary drums for each crop cut, is adopted. For this reason, when the diameters of the upper and lower rotary drums are equal, one cycle of shearing by accelerating to full speed and then decelerating to a full stop must be completed within approximately one revolution or approximately two revolutions of the rotary drums. In the case where the diameters of the upper and lower rotary drums are different, for example, when the ratio of the diameters of the upper and lower drums is 2:3, one shearing cycle of acceleration to full speed and then deceleration to a full stop must be completed within approximately three revolutions of the upper rotary drum.

Under the conditions of an upper rotary drum diameter of 0.8 m., a lower rotary drum diameter of 1.2 m., a $GD^2$ (inertial efficiency) of the upper and lower rotary drums converted to the lower rotary drum shaft of 20,000 kg.m.$^2$, and a strip hot-rolling speed of 1,200 m./min., for example, the required net acceleration torque of the upper and lower rotary drums converted to the lower rotary drum shaft becomes approximately 45,500 kg.m., which becomes 5,000 KW when converted into the required motor power with an overload of 300 percent. This is the result of an approximate calculation for the purpose of comparison in which the power required by the acceleration of the motor itself and other factors such as mechanical efficiency are not considered, but it indicates the necessity of a motor of an extremely high capacity.

Therefore, shears of this character are not practical for use in dividing by shearing of high-speed strips such as those which travel at speeds exceeding 1,000 m./min. as contemplated by this invention. Furthermore, with a start-stop control system of this character, since the upper and lower rotary drums are stopped at times other than when crop cutting is being carried out, the slipping occurring between the stopped lower rotary drum and the strip passing over the upper surface of the lower drum increases with increasing rolling speed. This gives rise to the problems of damage such as scoring, galling, and seizure of the strip surface, whereby the commercial value of the product is lost.

Still another problem is that, since rotary flying shears are of a type in which rotary drums are continuously rotated to accomplish shearing, the length of division by shearing per cut cannot be changed. Furthermore, any division shearing length greater than 10 m. cannot be obtained at will even by carrying out multiple-length shearing by a "miscut" method in which the diameters of the upper and lower rotary drums are made equal, and the upper or lower rotary drum is caused periodically to move vertically up and down, or by carrying out multiple-length shearing by a "miscut" method in which the upper and lower rotary drums are made with different diameters.

For this reason, it has been a practice heretofore, in the production of divided coils for external sales, to take up a hot strip once into a large coil, to uncoil this after cooling, to divide the same into lengths corresponding to the weight of the external-sale coils, and then to recoil these lengths. This practice, however, is disadvantageous in that recoiling equipment is additionally necessary.

A further problem as described below has been encountered in the production from strips hot rolled in a hot-strip mill of hot-rolled heavy-gage plates of thicknesses, for example, over 4.5 mm. and up to approximately 16 mm., comparable to plate products produced by plate mill equipments. In this production from strips, it has not been possible to divide by shearing at high speed each strip into lengths suitable for the cooling bed. For this reason, cooling of the strip as a long plate is impossible, and it has been the practice heretofore to carry out taking up of the hot strip once as a large coil, uncoiling the same after cooling, subjecting the same to skin pass or to leveling with a leveler or to cold leveling under great force over a number of stages in order to prevent warping in the entire cut plates after shearing or gas cutting, and thereafter carrying out finish dividing shearing thereby to produce the objective steel plates. In this production process, however, a cold working under great force is carried out in order to level the steel plates, and, for this reason, research on the dispersion and reduction of residual stresses as well as knowhow relating to production of warp-free plates are necessary.

SUMMARY OF THE INVENTION

It is an object of this invention to reduce remarkably the power consumption in flying shears of the instant character by eliminating acceleration and deceleration of the shear drums for each shearing operation.

Another object of the invention is to prevent scoring, galling, seizure, and like impairment of the surface of the strip material being processed.

Still another object of the invention is to provide flying shears capable of cutting the strip material to any desired sectional length above a minimum possible dividing length.

A further object of the invention is to provide flying shears for which recoiling line equipment for coils to be sold externally is unnecessary.

A further object of the invention is to provide flying shears by which cooling of hot-rolled strip as a long plate is made possible.

According to this invention, briefly summarized, there is provided in a flying shear machine of the rotary drum type having first and second shear drums provided with respective shear blade cutting edges and rotated in intercoupled state to shear stock material passed therebetween at a specific traveling speed, the combination therewith of: drum driving means comprising a power transmitting mechanism for intercoupling the two drums and a first motor for driving the drums continuously at tangential speeds synchronized with the traveling speed of the stock material; drum displacing means including a second motor and operated thereby to move the first drum between a retraction position apart from the second drum and a shearing position nearest the second drum at which the cutting edges are in registering coincidence to shear the stock material; and control means for controlling the second motor to operate the drum displacing means to undergo cycles of operation, each cycle comprising starting of the second motor at the instant of registering coincidence of the cutting edges but with the first drum in the retraction position, movement of the first drum to the shearing position for shearing of the stock material, and return of the first drum to the retraction position, at which the second motor stops.

The nature, principles and further features of this invention will be apparent from the following detailed description with respect to a preferred embodiment of the invention when read in conjunction with the accompanying drawings in which like parts are designated by like reference numerals.

DETAILED DESCRIPTION

Figure 1:
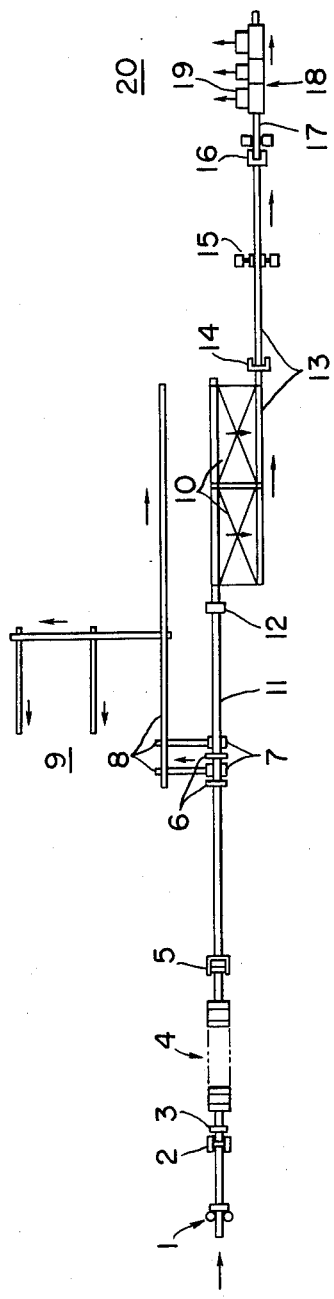
FIG. 1 is a diagrammatic plan view showing one example of the layout of a hot strip mill in which is installed a rotary drum type flying shear device according to this invention.

Referring first to FIG. 1, the hot strip mill illustrated therein includes, in order in the work flow direction, a roughing mill group 1, flying crop shears 2, a pinch-roll scale breaker 3, a finishing mill group 4, rotary drum type flying dividing shears 5 according to this invention, and pinch rolls 6 in front of coilers 7. Following these components is a line for producing coils including coils for external sale, which coil production line comprises the coilers 7, coil conveyers 8, and a coil yard 9. In succession to the coilers 7 is a plate production line comprising cooling beds 10 for cooling hot-rolled strip divided into multiple lengths of finishing plate, a cooling bed entry roller table 11 for introducing divided strip into the cooling bed 10, a hot leveller 12 installed upstream of the cooling beds 10, a cooling bed delivery shearing line roller table 13 laid out on the delivery side of the cooling beds 10, cold cropping shears 14 installed on the roller table 13 downstream from the cooling beds 10, rotary knife side trimming shears 15 with scrap chopper, flying shears 16 for cutting stock into desired sectional lengths, a piler approach table 17, automatic magnetic roller pilers 18, a shipping transfer system 19, and a shipping yard 20.

Figure 2:
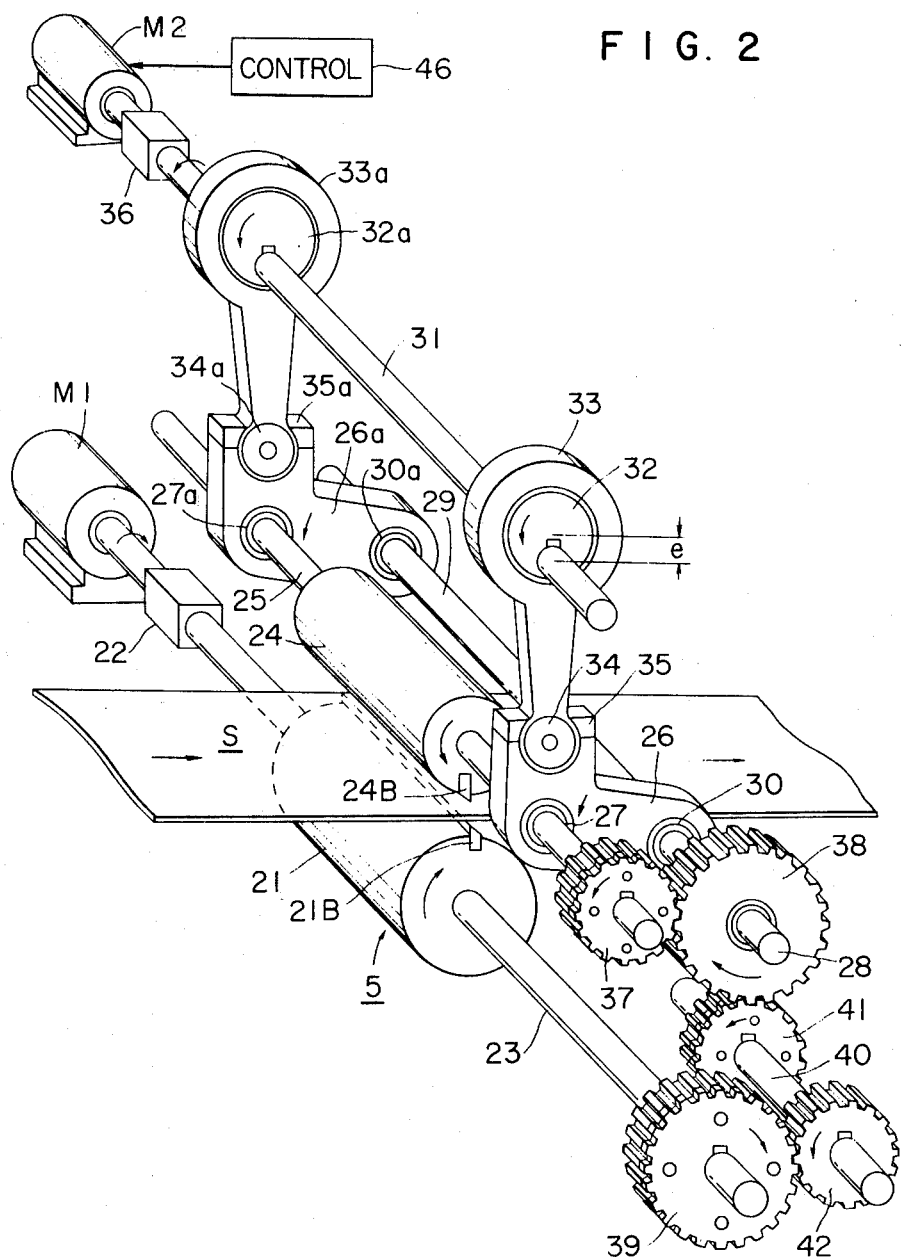
FIG. 2 is perspective view, with non-essential parts removed, showing the essential parts of a preferred form of the flying shears and the driving mechanism thereof according to the invention.

A preferred form of the above mentioned rotary drum type flying dividing shears 5 according to this invention is illustrated in FIG. 2. The principal parts of this shear device are a horizontally disposed lower shear drum 21 provided with a lower shear blade 21B on its cylindrical surface and an upper shear drum 24 provided with an upper shear blade 24B on its cylindrical surface and disposed in parallel above the lower shear drum 21, the upper and lower shear drums 21 and 24 being adapted to operate cooperatively as described hereinafter to shear a strip S passed therebetween by means of their shear blades 21B and 24B. The diameter of the upper shear drum 24 is smaller than that of the lower shear drum 21.

The lower shear drum 21 is fixedly mounted on a lower shear drum shaft 23 coupled to the rotor shaft of a motor M1 for driving the shear drums through speed reduction means 22, while the upper shear drum 24 is fixedly mounted on an upper shear drum shaft 25. The lower shear drum shaft 23 extends at its end remote from the motor M1 through the lower shear drum 21 to a gear mechanism described hereinafter, through which driving power is transmitted from the lower shear drum shaft 23 to the upper shear drum shaft 25.

The upper shear drum shaft 25 is rotatably supported by bearings 27 and 27a, on opposite sides of the upper shear drum 24, on middle parts of respective L-shaped bearing frames 26 and 26a contituting dual levers pivotally supported at their ends on one side by bearings 30 and 30a, respectively, through which coaxial pivot studs 28 and 29 are respectively fitted with a common centerline parallel to and spaced apart from the upper and lower shear drum shafts 25 and 23. The common centerline of the pivot studs 28 and 29 is fixed in space relative to the centerline of the lower shear drum shaft 23 by a fixed structural part (not shown) of the machine. Thus, the L-shaped bearing frames 26 and 26a, rotatably supporting at their middle parts the upper shear drum shaft 25 and the upper shear drum 24, are free to swing in unison about the pivot stud 28 and 29.

The plane in which the pivot studs 28 and 29 and the upper shear drum shaft 25 lie is substantially horizontal, whereby the swingable arms of the dual L-shaped bearing frames 26 and 26a extending between these pivot studs 28 and 29 and the shaft 25 are substantially horizontal. By this structural arrangement, the upper shear drum 24 can be moved toward and away from the lower shear drum 21 by the swinging of the bearing frames 26 and 26a downward and upward (counterclockwise and clockwise as viewed in FIG. 2 from a lower right position therein), respectively. The upper shear drum 24 is cyclically thus moved, as it rotates about its axis, by a mechanism as described below.

An eccentric cam shaft 31 is rotatably supported above, parallel to, and vertically spaced apart from the upper shear drum shaft 25 and is provided with identical eccentric cams 32 and 32a fixed thereto. These eccentric cams 32 and 32a are rotatably fitted in the upper proximal ends of respective pitmans (or cam follower straps) 33 and 33a. The lower ends of these pitmans 33 and 33a are formed as bulbous pressure heads 34 and 34a, respectively, received rotatably in corresponding partially cylindrical recesses formed at the upper ends of upwardly extending parts of the above described L-shaped bearing frames 26 and 26a, respectively, and are thus held by retainer members 35 and 35a, respectively, in coupled state with the bearing frames.

The lower shear drum shaft 23 and the eccentric cam shaft 31 are rotatably supported by respective bearings (not shown) on fixed structural parts of the machine (not shown) similarly as in the case of the pivot studs 28 and 29. Thus, when the eccentric cam shaft 31 is rotated by a motor M2 coupled to one end thereof via speed reduction means 36, the pitmans 33 and 33a are driven by the eccentric cams 32 and 32a to undergo substantially vertical reciprocation, and, as a consequence, the L-shaped bearing frames 26 and 26a pivotally oscillate about the pivot studs 28 and 29, whereby the upper shear drum 24 is caused to move toward and away from the lower shear drum 21.

One end of the upper shear drum shaft 25 extending through and past the bearing frame 26 is provided with an upper drum gear 37 fixed thereto. This gear 37 is meshed with an idler gear 38 fixed to the above mentioned pivot stud 28. The aforementioned end of the lower shear drum shaft 23 remote from the motor M1 supports a gear 39 fixed thereto and meshed with a gear 42 fixed to an idler shaft 40, to which is also fixed a gear 41. This gear 41 is meshed with the above mentioned idler gear 38. The idler shaft 40 is rotatably supported parallel to the lower shear drum shaft 23 by fixed structural parts of the machine. The above described gears 37, 41, and 39 are respectively provided with backlash eliminating gears.

As mentioned briefly hereinbefore, the upper and lower shear drums 24 and 21 are respectively provided with upper and lower shear blades 24B and 21B inbeddedly secured thereto at positions thereon to confront each other at the shearing position. The gear ratios of the above described gear transmission mechanism are so selected that the intermeshing standard circumferential veloxities of these shear blades 24B and 21B will be equal. Furthermore, adjustment of the clearance of the upper and lower shear blades 24B and 21B can be accomplished by using single helical gears for each of the gears 37, 38, 41, 42, and 39, shifting the idler shaft 40 in the axial direction, and rotating the gears 38, 37, and 39.

As described hereinbefore, the rotary drum type flying dividing shears 5 is obtained by adding a mechanism for driving the upper shear drum 24 including the motor M2 in up-and-down movement to the mechanism for driving both upper and lower shear drums 24 and 21 including the motor M1. The motor M1 always operates continuously to drive both drums 21 and 24 at a velocity synchronized to the traveling velocity of the strip S, while the motor M2 is adapted to perform driving intermittently with timing matched with the shearing instants of the two shear drums 21 and 24 only at the time of dividing shearing of the strip S.

Figure 3:
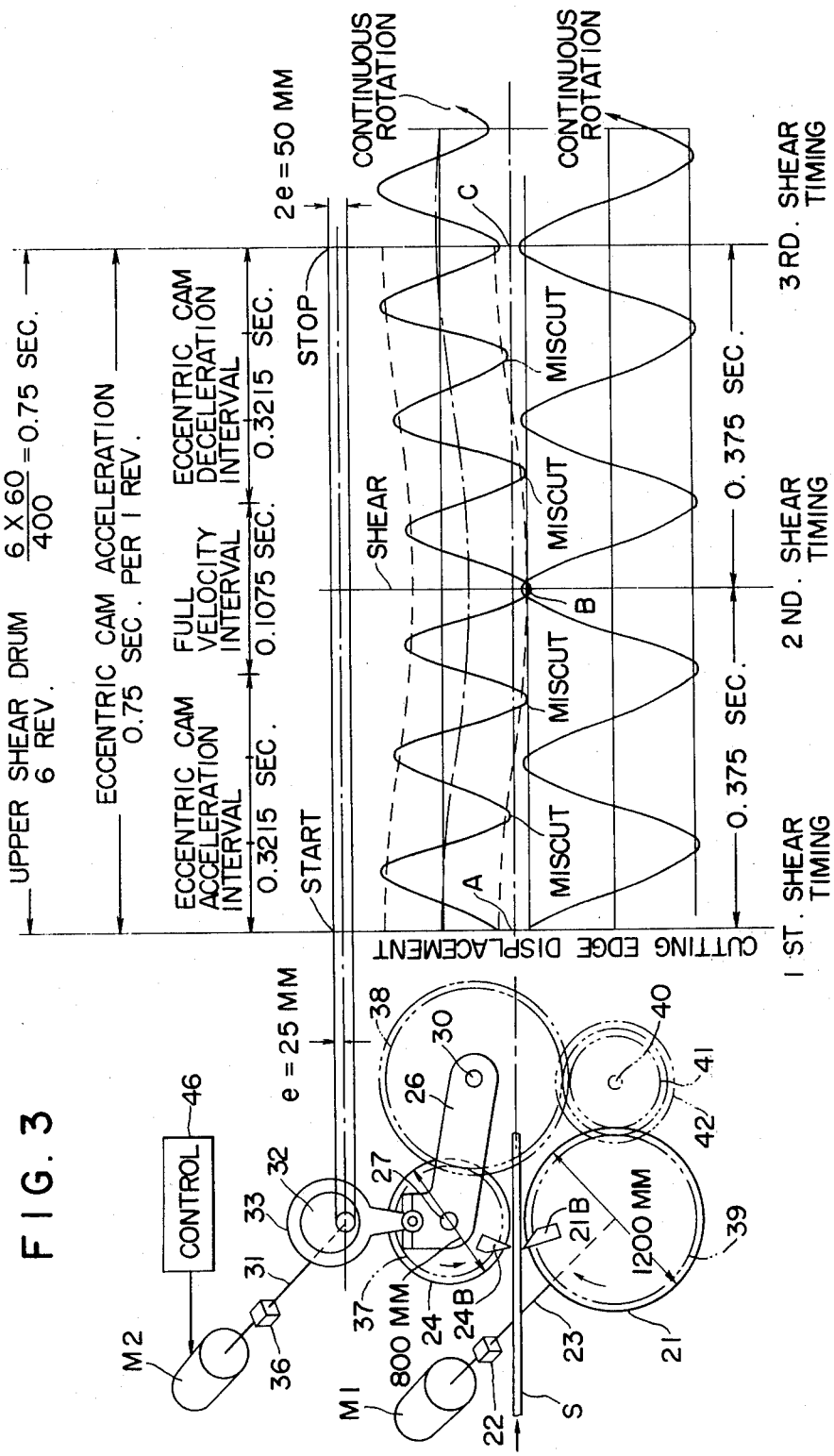
FIG. 3 is a combination of a time chart indicating the rotary drum operation cycles and a schematic diagram for a description of the dividing shearing of a strip.

More specifically, when a dividing shearing command is issued from control means 46 to the motor M2, the motor M2 is started at the first instant A (hereinafter referred to as first shear timing) of registering coincidence of the upper and lower shear blades 24B and 21B following the issuance of the shearing command as indicated in FIG. 3 and is thereafter accelerated with constant acceleration, reaching full velocity by the second instant B (hereinafter referred to as the second shear timing) of the succeeding registering coincidence of the upper and lower shear blades 24B and 21B. When, at the second shear timing B, the upper shear drum 24 is positioned at its lowest position and strip shearing by the upper and lower shear blades 24B and 21B is accomplished, the motor M2 decelerates with constant deceleration until it stops as at succeeding registering coincidence instant C (hereinafter referred to as the third shear timing) of the upper and lower shear blades 24B and 21B and positions the upper shear drum 24 at its highest point, whereupon one shearing cycle is completed.

Figure 4:
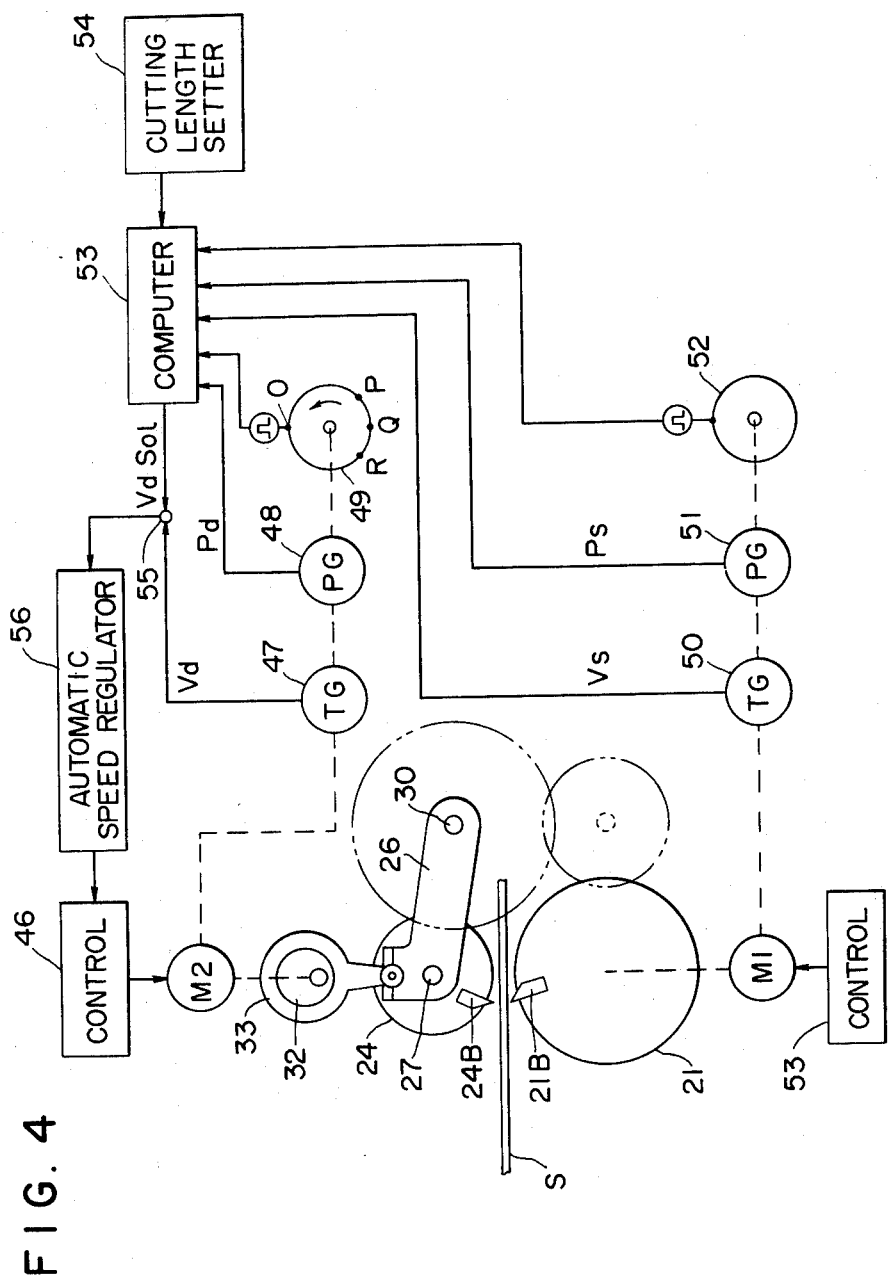
FIG. 4 is a schematic diagram, partly in block form, showing a control system for the flying shears shown in FIG. 2.

FIG. 4 shows one example of a control system for the motor M2. To the shaft of the motor M2 are connected a tacho-generator 47 for producing a signal Vd of the rotating speed of the eccentric cam shaft 31 and an impulse generator 48 for producing impulse signals Pd corresponding in number to the angle of rotation of the eccentric cam shaft 31. To the shaft of the motor M2 is also connected a position indicator 49 which produces impulse signals indicating the angular position of the eccentric cams 32 and 32a. These impulse signals are issued at positions O, P, Q and R. Position O is the highest position of the upper shear drum 24, P the position at which the acceleration has been completed, Q the lowest position of the drum 24 (cutting position), and R the position at which the deceleration starts.

To the shaft of the motor M1 are connected a tacho-generator 50 for producing a signal Vs of the tangential speed of the shear blades 21B and 24B and an impulse generator 51 for producing impulse signals Ps corresponding in number to the angle of rotation of the shear drum 21 or 24 and hence the peripheral distance through which the shear blade 21B or 24B has traveled. To the shaft of the motor M1 is also connected a position indicator 52 for producing a signal indicating the position at which the upper and lower shear blades 21B and 24B are brought into registry with each other. The motor M1 is operated under the control of control means 53.

The signals from the impulse generator 48, position indicator 49, tacho-generator 50, impulse generator 51 and position indicator 52 are sent to a computer 53 as input signals therefor. The computer 53 also receives a strip cutting length signal from a cutting length setter 54 and makes a computation therein. The output signal Vdsol from the computer 53 is a rotating speed signal, and the signal Vdsol and the signal Vd from the tacho-generator are compared in a comparator 55. A difference signal is sent from the comparator 55 to an automatic speed regulator 56 by which the motor M2 is controlled through the motor control means 46.

The principal merits of the flying shears of the invention for dividing hot-rolled strip under operational control as described above are as follows.

1. The total output of the motors M1 and M2 can be reduced to approximately 1/10 of the power required for acceleration and deceleration of only the upper and lower shear drums in the case where rotary crop shears of the start-stop control system are used under the same shearing conditions as those of the instant example of this invention.

2. Problems such as scoring, galling, and seizure of the strip surface are eliminated.

3. The strip can be cut to any desired sectional length above a minimum possible dividing length.

4. Recoiling line equipment for external sales is unnecessary.

5. Cooling of hot-rolled strip as a long plate is made possible.

In order to indicate more fully the nature and utility of this invention, the following analytical description with respect to concrete examples of practice with specific numerical values is set forth, it being understood that these examples are presented as illustrative only, and that they are not intended to limit the scope of this invention.

In one example, as illustrated in FIG. 3, the diameters of the upper and lower shear drums 24 and 21 are 0.8 m. and 1.2 m., respectively, and the rolling speed of the strip S is 1,200 m./min. Therefore, the rotational speed of the upper shear drum 24 is 480 rpm., and the time required for its one revolution is 0.125 sec.

The instant of registering coincidence of the upper and lower shear blades 24B and 21B occurs once for every three revolutions of the upper shear drum 24, i.e., every 0.375 sec., since the ratio of the diameters of the upper and lower shear drums is 2:3. Accordingly, the motor M2 is required to perform the operation of: starting and accelerating to full speed in the 0.375 sec. period from the first shear timing A to the second shear timing B; causing the upper shear drum 24 to descend to its lowest position to shear the strip at the second shear timing B; and decelerating and stopping in the 0.357 sec. period to the third shear timing C while causing the upper shear drum 24 to ascend to its highest position thereby to await the succeeding dividing shearing command signal. That is, the motor M2 is caused to start, accelerate to full speed, decelerate, and stop.

In this case, the eccentric cams 32 and 32a on the eccentric cam shaft 31 descend during a rotational angle of 180° and rise in the remaining 180°. However, if, as a supposition, ¾ (135°) of the rotational angle 180° of the descending time is taken for an acceleration interval of constant acceleration; ¾ (135°) of the rotational angle 180° for the rising time is taken for a deceleration interval of constant deceleration; and the remaining 90° is taken for the full-speed shearing interval, of the total required time of 0.75 sec. for the above mentioned starting and accelerating - full speed - decelerating and stopping, 3/7 will become the acceleration time, 1/7 will become the full-speed time, and 3/7 will become the deceleration time, the rotational speed of the eccentric cams 32 and 32a, and the eccentric cam shaft 31 at the time of full speed becoming 140 rpm.

Then, under the assumed conditions of a maximum shearing force of 300 (metric) tons, an eccentricity e of the eccentric cams 32 and 32a of 0.025 m. each, and rotational angle of the eccentric cams 32 and 32a of 135° at which the maximum shearing force is exerted, the maximum torque of the eccentric cam shaft 31 is 300 × 0.025 × sin 135° = 5.3 (metric) ton meter. Since the rotational speed at this time is 140 rpm., the rated output of the motor 36 becomes 300 KW with an overload of the motor of 280% and a mechanical efficiency of 0.9.

Then, when a low-inertia direct-current motor #916 (150/300 KW × 480/960 rpm. × 220/440 V) is selected for the motor M2, the total $GD^2$ of the drum vertical driving system converted to motor shaft is 80 kg.m.$^2$. If it is assumed that the motor accelerates at constant acceleration within 0.3215 sec., and acceleration torque of 637 kg.m. will be required, which is an overload of approximately 210% relative to the rated torque of the selected motor. If the deceleration torque is assumed to be substantially the same, the following calculation can be made with consideration given to the heat capacity of the motor.

| Shearing time | $\overline{2.8}^2 \times \tfrac{1}{4}$ | × 0.107 = 0.209 |
|---|---|---|
| Acceleration time | $\overline{2.1}^2$ | × 0.3215 = 1.418 |
| Deceleration time | $\overline{2.1}^2$ | × 0.3215 = 1.418 |

$\Sigma (\frac{\text{Load torque}}{\text{Rated torque}})^2 \times \text{Load time} = 3.045 \text{ sec.}$ Consequently, even when a leeway is considered, the motor capacity is of a magnitude whereby a minimum dividing shearing rate of one cycle in 3.5 sec. is possible. This can be represented as strip dividing length as follows. Since the rolling speed of the strip S is 1,200 m./min. = 20 m./sec., the minimum dividing shearing length possible of the strip S in consideration of the capacity of the selected motor is 20 m./sec. × 3.5 sec. = 70 m.

On one hand, the rotational speed of the upper shear drum 24 is 480 rpm., and a shear timing arrives once for three revolutions of the upper shear drum 24, that is, every 0.375 sec. Accordingly, in the case where the motor M1 is being operated continuously at constant speed, the strip S advances by 20 m./sec. × 0.375 sec. = 7.5 m. with one shear timing, and the actually possible dividing shearing length is an integral multiple of 7.5 m. Then, since the minimum possible dividing shearing length in view of the capacity of the selected motor exceeds 70 m. with a shear timing every 10 cycles, the actually possible minimum dividing shearing length becomes 75 m.

Accordingly, long length cooling of the strip S can be carried out by means of a cooling bed of a length of approximately 75 to 90 m. Furthermore, by varying the rotational speed of the motor 22 while the motor M2 is stopped, a minimum possible deividing shearing length of any desired value above 75 m. can be obtained.

Next, the capacity of the motor M1 will be considered. It will be assumed that, for this motor M1, a low-inertia direct-current motor #914 (110/220 KW × 500/1000 rpm. × 220/440 V) is selected. Then, under the conditions of a $GD^2$ of the drum rotational driving system converted to motor shaft of 2,086 kg.m.$^2$, a maximum shearing force of 300 tons, and a thickness of the strip S of 12.7 mm. (½ inch), the shearing energy E is 2,286 kg.m.

Accordingly, the speed drop of the motor M1 at the time of shearing is calculated as the difference between the motor rotational speed $N_1$ = 1,000 rpm. at the start of the shearing action and the motor rotational speed $N_2$ = $\sqrt{N_1^2 - 7{,}150\, E/GD^2}$ = 996 rpm. immediately after the shearing action, which difference is 4 rpm. Thus, the speed drop is held to 0.4%, which is amply within practical limits. If this speed drop of 4 rpm. can be regained in 0.05 sec., the required acceleration torque becomes 445 kg.m., which is an overload of approximately 208% relative to the rated torque of 214 kg.m. of the selected motor. This overload is also within practical limits.

Furthermore, when the acceleration torque is taken as approximately 300% of the rated torque of the motor M1, that is, 642 kg.m., the time required for acceleration from starting to full speed is approximately 8.7 seconds, and the acceleration rate is 1,200/8.7 $\approx$ 138 m./min./sec. since the strip rolling speed is 1,200 m./min., whereby there is a leeway factor of more than two times in comparison with the acceleration rate of 60 m./min./sec. of the motor of the hot strip mill or the motor of the strip coiling machine.

In the foregoing analysis, the motor capacity and related quantities were considered with respect to the case of a strip rolling speed of 1,200 m./min., a strip thickness of 12.7 mm., a maximum shearing force of 300 tons, and diameters of the upper and lower shear drums of 800 and 1,200 mm., respectively. The total motor capacity in this case is 220 KW + 300 KW = 520 KW, which is approximately 1/10 of the power of 5,000 KW required for acceleration of only the upper and lower shear drums (of drum diameters of 800 and 1,200 mm., respectively) in the case where rotary crop shears of a conventional start-stop control system are used for flying dividing shearing of a high-speed strip traveling at 1,200 m./min.

Furthermore, since the upper and lower shear drums are driven continuously at a speed which is substantially in tune with the strip rolling speed, problems such as scoring, galling, and seizure of the strip reverse surface due to slipping between the lower shear drum 21 and the strip S passing over the upper surface thereof are eliminated. Still another advantageous feature of this invention is that, since the minimum possible dividing shearing length in the instant example is 75m., long length cooling of the strip S can be carried out by means of a cooling bed of a length of approximately 75 to 90 m. A further feature is that, since it is possible to change the shearing length for each cut, and any desired dividing shearing length greater than the minimum possible dividing shearing length can be obtained, the problems as described before which arise when conventional rotary flying shears for cutting stock into desired sectional lengths are used as they are for high-speed shearing as in the instant example can be overcome.

In accordance with this invention as described above, the upper and lower shear drums are continuously rotated throughout the operation, and one of the shear drums is moved vertically toward the other drum only at the instant of shearing thereby to carry out shearing. For this reason, the strip can be divided into any desired length with a device of relatively simple construction and, moreover, with minimum total motor output even at a high strip rolling speed exceeding 1,000 m./min., for which the selection of the motor has heretofore been considered difficult. Furthermore, in the practice of this invention, recoiling line equipment for external sale coils is unnecessary, or cooling with long plates of the strip is made possible, and problems such as scoring, galling and seizure of the strip surface are solved.

What is claimed is:

1. In a flying shear machine of the type including a first shear drum provided with a first shear blade cutting edge, a second shear drum provided with a second shear blade cutting edge, said drums being oppositely disposed and having different diameters such that miscuts of stock material can occur between cuts of the material by said cutting edges, drum driving means for continuously driving said drums at speeds such that the tangential speeds of the cutting edges are synchronized with the stock material traveling speed, and drum displacing means for moving said first drum toward and away from said second drum, said cuts being made when said first drum is moved to a position nearest said second drum at which said cutting edges are in registering coincidence to shear the stock material: the improvement comprising motive power means for operating said drum displacing means, said motive power means being independent from said drum driving means, and control means for controlling said motive power means to operate said drum displacing means to cause it to undergo cycles of operation, each cycle including starting at a first shear timing with said first drum in a position remote from said second drum, accelerating said motive power means and hence said drum displacing means in a direction of displacement of the first drum toward the second drum, causing said first drum at a second shear timing to reach said position nearest the second drum, at which said cutting edges assume registering coincidence to shear the stock material and at which said motive power means is at its full velocity. decelerating said motive power means and hence said drum displacing means in a direction of displacement of the first drum to return to said position remote from the second drum at a third shear timing, at which said motive power means stops.

2. The improvement as claimed in claim 1, wherein said control means operates said drum displacing means so as to cause it to undergo each of said cycles of operation during six revolutions of said first drum and four revolutions of said second drum.

* * * * *